Patented Sept. 23, 1952

2,611,153

UNITED STATES PATENT OFFICE 2,611,153

TEMPORARY PROTECTIVE COATING AND METHOD OF VULCANIZING

Stephen T. Semegen, Cuyahoga Falls, Ohio, assignor to The B. F. Goodrich Company, New York, N. Y., a corporation of New York No Drawing. Application January 29, 1948,
Serial No. 5,179

13 Claims. (Cl. 18—53)

1

This invention relates to temporary protective coatings and pertains more specifically to a temporary protective coating for a rubber article.

It is an object of this invention to provide a temporary protective coating for rubber, wood, metal, etc. surfaces which is sufficiently adherent to the surface to which it is applied to remain firmly secured thereto during handling, storage, etc. but which may readily be removed from such surface by a simple peeling operation to leave the surface clean and free from shreds or patches of the coating material. Another object is to provide a method for preventing adhesion of adjacent surfaces of a rubber article during vulcanization. Another object is to provide a temporary protective coating for the surface of a vulcanizable rubber composition, which coating is sufficiently tacky or adhesive to facilitate the construction of a composite article from said composition but which may readily be removed after vulcanization thereof to produce clean nonadherent rubber surfaces. Another object is to provide a temporary protective coating for vulcanized rubber articles which will protect said article from the effects of sunlight, oxygen, ozone, and the like which have a deleterious effect upon rubber, which coating may readily be removed without damage to the underlying rubber surface. Other and further objects will be apparent from the description which follows.

I have discovered that a homogeneous mixture comprising two polymeric materials in specified proportions possesses the unique properties required for such temporary protective coatings. One of the polymeric materials employed is a plastic polymer of an ester of acrylic acid, while the other is a polymer prepared by the polymerization of a monomeric material comprising predominantly a chloroethylene containing from one to two chlorine atoms on one only of the carbon atoms, the polymers being present in the proportion of 15 to 200 parts by weight of the latter for each 100 parts by weight of the former. For most purposes, it is preferred to employ from 20 to 150 parts by weight of the chloroethylene polymer for each 100 parts of acrylate polymer.

Although any plastic or fusible polymers made by the polymerization of an ester of acrylic acid may be used in the practice of this invention, plastic polymers made by the polymerization of esters of acrylic acid with saturated aliphatic monohydric alcohols are of greatest importance; among such polymers are those made by the polymerization of 2-chlorethyl acrylate, beta-diethylaminoethyl acrylate, 2-methoxyethyl acrylate, 2-ethoxyethyl acrylate, 2-butoxyethyl acrylate, and the like. Particularly important are polymers made by the polymerization of alkyl esters of acrylic acid, such as methyl acrylate, ethyl acrylate, n-propyl acrylate, isobutyl acrylate, n-amyl acrylate, lauryl acrylate, and the like. All of the foregoing esters of acrylic acid may be polymerized by the methods commonly employed for polymerization of methyl acrylate. The esters themselves may be prepared in a conventional manner by reacting the appropriate alcohol with acrylic acid or acrylic acid chloride under esterification conditions, or by other known methods.

The second polymeric material employed, that made by the polymerization of a monomeric material comprising predominantly (i. e., containing over 50% by weight of) a chloroethylene containing from one to two chlorine atoms on one only of the carbon atoms, includes polymers of vinyl chloride, vinylidene chloride, mixtures of these two materials, or mixtures of one or both of these materials with a lesser proportion of another monomer copolymerizable therewith containing a single olefinic double bond such as vinyl bromide, vinyl fluoride, vinyl acetate, vinyl propionate, vinyl butyrate, vinyl chloroacetate, vinylidene fluoride, vinylidene bromide, vinylidene chloro fluoride, dimethyl fumarate, dimethyl maleate, diethyl maleate, dibutyl maleate, diethyl chloromaleate, methyl acrylate, ethyl acrylate, methyl methacrylate, methyl ethacrylate, methyl alpha-chloroacrylate, styrene, p-chlorostyrene ethylene, isobutylene, and the like. Of these polymers, high molecular weight polyvinyl chloride is particularly useful.

The polymeric components of my coating material may be mixed or blended in any desired manner. The solid materials may be mixed on a roll mill or in an internal mixer; aqueous dispersions or suspensions of the polymers may be mixed by simple stirring; or, if desired, solutions of the polymers in volatile solvents may be stirred together.

Any of the compounding ingredients commonly used in the plastics industry may be added to the polymer blend if desired; among such materials are fillers, pigments, reinforcing agents, stabilizers, dyes, plasticizers, etc. A curing agent for the acrylic ester polymer may be employed in a preferred embodiment of my invention, although this feature is not essential. When such a curing agent is employed and the coating is cured by heating it, the tensile strength or cohesiveness of the coating is increased and its adhesiveness to the rubber surface is decreased, so that it is more readily removed therefrom. Any of the known curing agents for such acrylic ester polymers may be employed such as the alkali metal silicates described in U. S. Patent No. 2,411,899, issued December 3, 1946, the alkali metal vanadates described in U. S. Patent No. 2,412,476, issued December 10, 1946, the alkali metal stannates described in U. S. Patent No. 2,412,475, issued December 10, 1946, or other known curing agents.

The coating material may be applied to the surface of any rubber composition either before or after vulcanization. Among the rubber compositions to which my new coating material may be applied are those made with vulcanizable natural rubber such as caoutchouc, balata, gutta percha, or the like, and vulcanizable synthetic rubbers such as rubbery polychloroprene or the rubbery copolymers of butadiene-1,3 hydrocarbons with ethylenic monomers copolymerizable therewith such as styrene, acrylonitrile, methyl methacrylate, isobutylene, or the like.

The coating material of this invention may be used in the form of an aqueous dispersion or latex, or in the form of a solution in a suitable volatile solvent such as acetone, methyl ethyl ketone, mixtures of these with methyl alcohol or ethyl alcohol, etc. The solution or dispersion may be applied to the rubber surface by brushing, dipping, spraying, or by any other suitable method.

When it is desired to prevent adhesion of adjacent rubber surfaces in a composite article during vulcanization, as in the case of molded rubber article having pockets or flaps, it may be desirable to employ as a molding element a separator made of hard rubber, wood, fabric impregnated with synthetic resin or hard rubber, or the like, and to coat the surfaces of the separator which are to be in contact with the rubber with my coating material. If additional tackiness or adhesiveness is desired to hold the various elements in place during construction of the article, a layer of rubber cement or latex cement may be applied on top of my coating material. This rubber layer, of course, will be permanently adhered to the surface of the rubber article during vulcanization, whereas the separator may be removed together with the temporary protective coating after vulcanization of the article is complete.

The following specific examples will serve to illustrate more clearly the nature of my invention but are not intended as a limitation thereon.

*Example I*

The following composition, in which the parts are by weight, is prepared by mixing the ingredients on a roll mill:

| | Parts |
|---|---|
| Plastic polymer of methyl acrylate | 80 |
| Polyvinyl chloride | 20 |
| Sodium metasilicate | 10 |
| Hydrated lime | 6 |
| Water ground mica | 15 |
| Whiting | 15 |
| Channel black | 35 |
| Wool grease | 5 |

The wool grease in the composition is used to facilitate mixing of the composition on the roll mill and to minimize sticking of the composition to the mill.

One hundred parts by weight of the mixed polymer composition is then dissolved in a mixture of 207 parts by weight of methyl ethyl ketone, 42 parts of ethyl alcohol, and 26 parts of water, the water serving to reduce the viscosity of the solution and prevent gelation thereof.

The surfaces of vulcanizable rubber articles are coated with this solution and allowed to dry. The articles are then vulcanized in a mold with their coated surfaces in contact, and after vulcanization is completed the articles may readily be separated and the coating may easily be removed by simply peeling it. The heat required for vulcanization of the rubber articles serves also to cure the coating composition, giving it added strength and facilitating its removal from the rubber surface in a single piece, even before the vulcanized articles have cooled.

*Example II*

An aqueous dispersion or latex of high molecular weight polyvinyl chloride containing 54% by weight of polymer is mixed by stirring with an aqueous dispersion of a plastic polymer of ethyl acrylate (49% by weight) to give a mixed latex containing 40 parts by weight of polyvinyl chloride and 60 parts of polyethyl acrylate. The mixed latex is then employed in the same way as the solution of Example I with similar results. Vulcanized natural or synthetic rubber articles coated with the composition and allowed to dry at room temperature are completely protected from dirt, abrasion, sunlight, etc., during handling and storage, yet the protective coating is readily removed when desired.

*Example III*

The following composition, in which the parts are by weight, is prepared by mixing the ingredients on a roll mill:

| | Parts |
|---|---|
| Plastic polymer of ethyl acrylate | 50 |
| Polyvinyl chloride | 50 |
| Sodium metasilicate | 10 |
| Wool grease | 5 |
| Hydrated lime | 6 |
| Channel black | 20 |
| Whiting | 20 |
| Wax | 4 |

After mixing, the composition is dissolved in 224 parts by weight of methyl ethyl ketone. The solution, when sprayed or brushed on the surface of vulcanized rubber tires or similar rubber articles provides effective protection during shipment and storage. The coated article need not be heated to cure the coating, but when stored for a sufficiently long time in a hot climate the coating may become cured in place. The coating may readily be removed either before or after it is cured, although the curing step facilitates removal thereof.

Similar results are obtained with other mixtures containing from 15 to 200 parts by weight of polyvinyl chloride or the like for each 100 parts of acrylic ester polymer. When less than 15 parts of the first component is employed, the coating is excessively tacky and lacks cohesive strength, so that it is extremely difficult to remove; when more than 200 parts of this component is used, the coating is brittle and does not adhere well to the surface to which it is applied.

The thickness of the coating of this invention may be varied over a wide range. For most purposes, however, a thickness between 0.005 inch and .030 inch will be found most satisfactory. Since the coating is flexible and elastic, the rubber surface to which it is applied may be flexed or distorted without danger of cracking or separation of the coating.

Although various specific embodiments of the invention have been described, I do not intend to limit myself solely thereto but to include all of the obvious variations and modifications falling within the spirit and scope of the appended claims:

I claim:

1. The method of temporarily protecting a surface of a vulcanizable rubber article during vulcanization thereof which comprises applying directly to the surface to be protected a thin coating of a liquid composition comprising 100 parts by weight of a plastic polymer of an ester of acrylic acid, from 15 to 200 parts of a polymer of a monomeric material comprising predominantly a chloroethylene having from one to two chlorine atoms on one only of the carbon atoms, a volatile liquid vehicle, and a curing agent for said ester polymer, removing said vehicle to provide a solid coating on said surface, and heating said article and said coating to vulcanize said article and to cure the composition of said coating to form a temporary protective coating on said surface readily removable therefrom by peeling.

2. The method of temporarily protecting the surface of a vulcanizable rubber article during vulcanization thereof which comprises applying directly to the surface to be protected a thin coating of a liquid composition comprising 100 parts by weight of a plastic polymer of an alkyl ester of acrylic acid, from 15 to 200 parts of polyvinyl chloride, a volatile liquid vehicle, and a curing agent for said ester polymer, removing said vehicle to provide a solid coating on said surface, and heating said article and said coating to vulcanize said article and to cure the composition of said coating to form a temporary protective coating on said surface readily removable therefrom by peeling.

3. The method of temporarily protecting the surface of a vulcanizable rubber article during vulcanization thereof which comprises applying directly to the surface to be protected a thin coating of a liquid composition comprising 100 parts by weight of polyethyl acrylate, from 15 to 200 parts of polyvinyl chloride, a volatile liquid vehicle, and a curing agent for said acrylate polymer, removing said vehicle to provide a solid coating for said surface, and heating said article and said coating to vulcanize said article and to cure the composition of said coating to form a temporary protective coating on said surface readily removable therefrom by peeling.

4. The method of preventing adhesion during vulcanization of adjacent surfaces of a vulcanizable rubber composition which method comprises interposing between said surfaces indirect contact therewith a separator element comprising a base member having on its outer surfaces a thin layer of material comprising 100 parts by weight of a plastic polymer of an ester of acrylic acid, from 15 to 200 parts of a polymer of a monomeric material comprising predominantly a chloroethylene having from one to two chorine atoms on one only of the carbon atoms, and a curing agent for said ester polymer, heating said composition and layer to vulcanize said composition and to cure said layer of material, and removing said separator element from between said surfaces.

5. The method of preventing adhesion during vulcanization of adjacent surfaces of a vulcanizable rubber composition, which method comprises interposing between said surfaces indirect contact therewith a separator element comprising a base member having on its outer surfaces a thin layer of material comprising 100 parts by weight of a plastic polymer of an alkyl ester of acrylic acid and from 15 to 200 parts of polyvinyl chloride, and a curing agent for said ester polymer, heating the assembly to vulcanize said composition and cure said layer of material with said separator element in position between said surfaces, and removing said separator element from between said surfaces.

6. An article of manufacture having a surface comprising a vulcanized rubber composition, at least a portion of said surface being covered with a cured coating comprising 100 parts by weight of a plastic polymer of an ester of acrylic acid, from 15 to 200 parts of a polymer of a monomeric material comprising predominantly a chloroethylene having from one to two chlorine atoms on one only of the carbon atoms, and a curing agent for said ester polymer, said coating being in direct contact with said surface and being readily removable therefrom by peeling.

7. An article of manufacture having a surface of vulcanized rubber composition, at least a portion of said surface being covered by a temporary protective cured coating comprising 100 parts by weight of a plastic polymer of an alkyl ester of acrylic acid, from 15 to 200 parts by weight of polyvinyl chloride, and a curing agent for said ester polymer, said coating being in direct contact with said surface and being readily removable from said surface by peeling.

8. An article of manufacture having a surface of vulcanized rubber composition, at least a portion of said surface being covered by a temporary protective cured coating comprising 100 parts by weight of polyethyl acrylate, from 15 to 200 parts by weight of polyvinyl chloride, and a curing agent for said polyethyl acrylate, said coating being in direct contact with said surface and being readily removable from said surface by peeling.

9. An article of manufacture having a surface of vulcanized rubber composition, at least a portion of said surface being covered by a temporary protective cured coating comprising 100 parts by weight of polymethyl acrylate, from 15 to 200 parts by weight of polyvinyl chloride, and a curing agent for said polymethyl acrylate, said coating being in direct contact with said surface and being readily removable from said surface by peeling.

10. An article of manufacture having a surface of vulcanized rubber composition, at least a portion of said surface being covered by a cured temporary protective coating comprising 100 parts by weight of a plastic polymer of an alkyl ester of acrylic acid, from 15 to 200 parts by weight of a polymer prepared by the polymerization of a chloroethylene containing from one to two chlorine atoms on one only of the carbon atoms, and a curing agent for said ester polymer, said coating being in direct contact with said surface and being readily removable therefrom by peeling.

11. In combination, an article having opposing faces comprising a vulcanizable rubber composition, which faces would normally adhere together during vulcanization, and interposed between said faces in adherent but readily separable contact therewith a separator element comprising 100 parts by weight of a plastic polymer of an ester of acrylic acid, from 15 to 200 parts of a polymer of a monomeric material comprising predominantly a chloroethylene having from one to two chlorine atoms on one only of the carbon atoms, and a curing agent for said ester polymer, said separator element being readily removable from said article after vulcanization thereof.

12. In combination, an article having opposing faces comprising a vulcanizable rubber composition, which faces would normally adhere together during vulcanization, and interposed between said faces in adherent but readily separable contact therewith a separator element comprising a base member having at its outer faces a thin layer of a composition comprising 100 parts by weight of a plastic polymer of an alkyl ester of acrylic acid, from 15 to 200 parts of polyvinyl chloride, and a curing agent for said ester polymer, said separator element being readily removable from between the opposing faces of said article after vulcanization thereof.

13. In combination, an article having opposing faces comprising a vulcanizable rubber composition, which faces would normally adhere together during vulcanization, and interposed between said faces in adherent but readily separable contact therewith a separator element comprising a base member having at its outer faces a thin layer of a composition comprising 100 parts by weight of polyethyl acrylate, from 15 to 200 parts of polyvinyl chloride, and a curing agent for said polyethyl acrylate, said separator element being readily removable from between the opposing faces of said article after vulcanization thereof.

STEPHEN T. SEMEGEN.

REFERENCES CITED

The following references are of record in the file of this patent:

UNITED STATES PATENTS

| Number | Name | Date |
|---|---|---|
| 1,068,691 | Moomy | July 29, 1913 |
| 2,169,062 | Way | Aug. 8, 1939 |
| 2,201,271 | Partridge | May 21, 1940 |
| 2,310,619 | Dillehay | Feb. 9, 1943 |
| 2,336,792 | Langkammerer | Dec. 14, 1943 |
| 2,366,414 | Lindh | Jan. 2, 1945 |
| 2,396,313 | Bropby | Mar. 12, 1946 |

OTHER REFERENCES

Ser. No. 342,900, Fichert (A. P. C), published Apr. 27, 1943.